Sept. 9, 1924.
S. D. KRETZER
1,507,609
ELECTRICAL CONNECTER
Filed Sept. 22, 1921
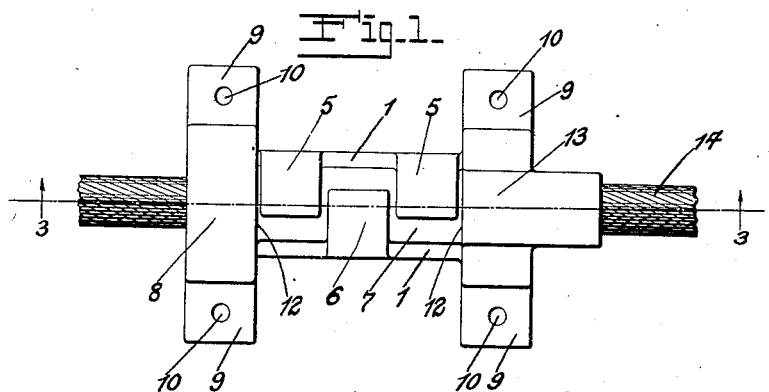
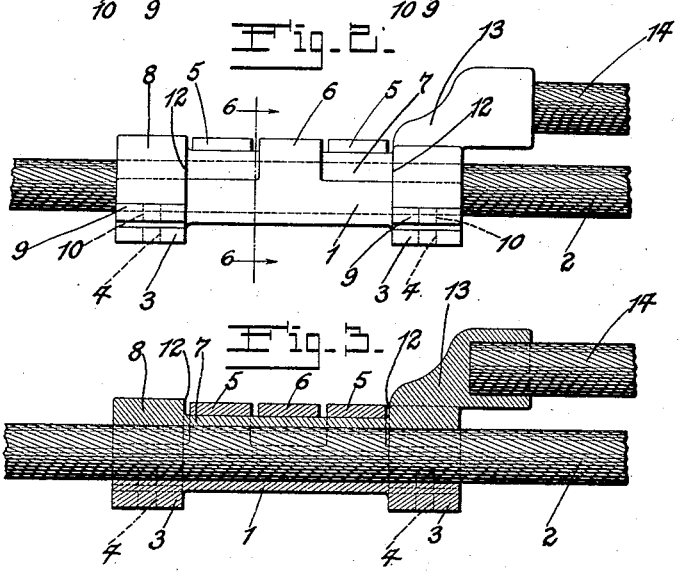
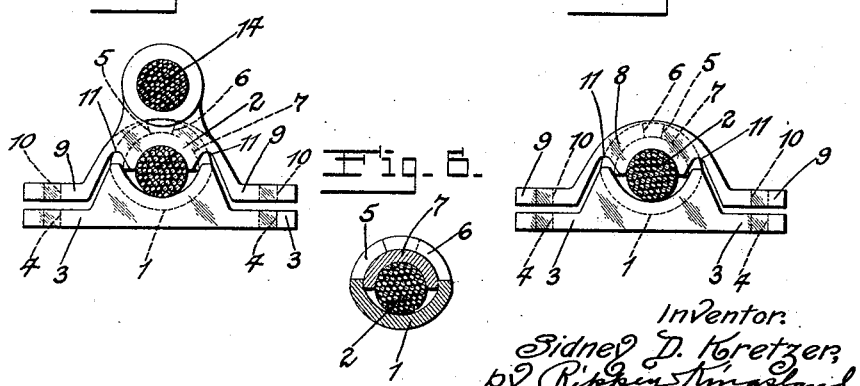
Inventor:
Sidney D. Kretzer,
by Rippey Kingsland
His Attorneys.

Patented Sept. 9, 1924.

1,507,609

UNITED STATES PATENT OFFICE.

SIDNEY D. KRETZER, OF ST. LOUIS, MISSOURI.

ELECTRICAL CONNECTER.

Application filed September 22, 1921. Serial No. 502,381.

*To all whom it may concern:*

Be it known that I, SIDNEY D. KRETZER, a citizen of the United States, residing at the city of St. Louis and State of Missouri, have invented a new and useful Electrical Connecter, of which the following is a specification.

This invention relates to improvements in electrical connecters, and consists in the novel construction hereinafter described.

An object of the invention is to provide an electrical connecter for connecting a main electrical cable with a branch cable, whereby an efficient contact between the two is provided.

Other advantages of the construction will appear from the following detailed description thereof taken in connection with the accompanying drawing, in which—

Fig. 1 is a top plan view of the connecter.

Fig. 2 is a side elevation.

Fig. 3 is a section taken on the line 3—3 of Fig. 1.

Fig. 4 is an end elevation.

Fig. 5 is an opposite end elevation.

Fig. 6 is a section taken on the line 6—6 of Fig. 2.

In the embodiment of the invention illustrated in the drawing the device consists of a bottom member formed of an integral casting 1 forming a trough in which the cable 2 seats. At each end of the lower member are laterally projecting lugs 3 having openings 4 therein. Rising from one side wall of the member 1 intermediate the lugs 3 and in spaced relationship in respect of each other are lugs 5 adapted to be overturned over the upper clamp member of the device. Intermediate the lugs 5 and rising from the opposite wall of the part 1 is a lug 6 adapted to over-turn over the upper clamp member in the space intermediate the lugs 5.

The top clamp member consists of a semitubular portion 7 that fits over the top of the cable 2. At each end of the part 7 is an arched flange 8 that has laterally projecting lugs 9, said lugs 9 having openings 10 therein that register with the openings 4.

In each of the arched flanges 8 and in the under faces thereof are grooves 11 for centering the clamp members by receiving the edges of the walls of the channel in the member 1. The arched flanges 8 provide shoulders 12 that constitute abutments limiting the longitudinal movement of the two clamping members and holding them in proper adjustment. Rising from one of the arched flanges 8 is a socket 13 adapted to receive the end of a branch cable 14, the end of the cable preferably being soldered into the socket 13.

In assembling the device the cable 2 is seated in the trough of the lower clamp member and the upper clamp member fitted over the cable. The lugs 5 and 6 are then bent over the top wall of the upper clamp member, securing the clamps together and holding the cable in close contact with both elements of the clamping member.

In attaching the cable to a supporting structure screws or nails are driven through the registering openings 9 and 4, drawing the flanges of both clamp members together and holding the cable in secure clamping adjustment between the two members of the device, as well as supporting the cable in position on the structure.

Obviously, the construction may be varied in details without departing from the spirit and scope of the invention. I do not limit myself therefore to exact details of construction and arrangement as shown, but what I claim and desire to secure by Letters Patent, is:—

1. A clamp support for electrical cables, comprising a base member having a channel therein for receiving a cable, a cooperating clamp member having grooves receiving the side edges of the base member, extending ears on the wall of the channel of the first-named member clamped over the wall of said second-named member, a socket formed in connection with said second-named member for receiving the end of a branch cable, and laterally extending lugs on said members having registering holes for receiving fastening devices.

2. In a device of the class described, a base member of relatively large diameter having laterally extending lugs at each end thereof, said lugs having perforations therein to receive fasteners, a cooperating member of less diameter than the base member and having a channel therein adapted to fit over said base member, a flange formed at each end of said cooperating member having lateral extensions registering with the extensions on the base member and having perforations in said extensions registering with the perforations in the extensions of the base member, lugs on the base member adapted to over-turn over the wall of said cooperating member to hold the two members in clamping engagement, and a terminal socket formed integral with said cooperating member for receiving the terminal of a branch cable.

3. A device of the class described, comprising a base having a semi-tubular portion and laterally extending lugs at each end, said lugs having perforations therein, a cooperating member having a semi-tubular portion of less diameter than the semi-tubular portion of the first-named member adapted to fit over said first-named member, and being provided with centering grooves for receiving the ends of the wall of the semi-tubular portion of said first-named member, clamping devices in connection with said first-named member adapted to over-turn over the wall of the semi-tubular portion of the second-named member, and a socket formed integral with said second-named member for receiving the end of a branch terminal.

SIDNEY D. KRETZER.